United States Patent [19]

Suzuka

[11] Patent Number: 5,335,030
[45] Date of Patent: Aug. 2, 1994

[54] VIEW FINDER OF ZOOM LENS CAMERA

[75] Inventor: Shinya Suzuka, Tokyo, Japan

[73] Assignee: Asahi Kogaku Kogyo Kabushiki Kaisha, Tokyo, Japan

[21] Appl. No.: 952,070

[22] Filed: Sep. 28, 1992

[30] Foreign Application Priority Data

Sep. 30, 1991 [JP] Japan ................. 3-320856
Sep. 30, 1991 [JP] Japan ................. 3-320857
Sep. 30, 1991 [JP] Japan ................. 3-320858

[51] Int. Cl.5 .................................. G03B 15/03
[52] U.S. Cl. ...................... 354/149.1; 354/222; 354/199
[58] Field of Search ............ 354/403, 149.1, 149.11, 354/195.1, 199, 219, 222

[56] References Cited

U.S. PATENT DOCUMENTS

| | | | |
|---|---|---|---|
| 4,887,109 | 12/1989 | Fujita et al. | 354/222 |
| 4,914,461 | 4/1990 | Hori | 354/149.1 |
| 4,916,475 | 4/1990 | Hori | 354/149.1 X |
| 4,936,664 | 6/1990 | Haraguchi et al. | 354/149.11 X |
| 4,944,030 | 7/1990 | Haraguchi et al. | 354/149.1 X |
| 4,951,074 | 8/1990 | Ueda | 354/149.1 |
| 4,965,615 | 10/1990 | Fujita et al. | 354/145.1 |
| 4,967,218 | 10/1990 | Numako et al. | 354/195.1 |
| 4,967,219 | 10/1990 | Morisawa et al. | 354/199 |
| 4,992,809 | 2/1991 | Nozaki et al. | 354/149.11 |
| 5,012,262 | 4/1991 | Mogamiya et al. | 354/149.1 |
| 5,012,273 | 4/1991 | Nakamura et al. | 354/195.1 X |
| 5,068,678 | 11/1991 | Mogamiya et al. | 354/199 |
| 5,083,146 | 1/1992 | Ueda | 354/149.1 |
| 5,111,227 | 5/1992 | Ogawa | 354/199 |

FOREIGN PATENT DOCUMENTS

| | | |
|---|---|---|
| 61-208040 | 9/1986 | Japan . |
| 1311513 | 3/1973 | United Kingdom . |
| 2184248 | 6/1987 | United Kingdom . |
| 2224359 | 5/1990 | United Kingdom . |

OTHER PUBLICATIONS

Patent Abstracts of Japan, vol. 11, No. 037 (P-543), Feb. 4, 1987.

Primary Examiner—Howard B. Blankenship
Attorney, Agent, or Firm—Sandler, Greenblum & Bernstein

[57] ABSTRACT

A view finder of a zoom lens camera including a zoom lens, an object distance measuring device having a light emitter and a light receiver, and a zoom finder device which varies the field of view of the finder in association with the zoom lens. The zoom finder device is placed between the light emitter and the light receiver of the object distance measuring device.

24 Claims, 6 Drawing Sheets

VIEW FINDER OF ZOOM LENS CAMERA

BACKGROUND OF THE INVENTION

1. Field of the Invention

The present invention relates to a view finder of a zoom lens camera and a zoom strobe device thereof.

2. Description of Related Art

In a known lens shutter type of power zoom camera having a power zoom lens, a zoom finder, a zoom strobe device, and an active object distance measuring device which includes a light emitter and a light receiver, the illumination angle of the strobe device is varied in association with the zooming operation of the finder.

In a conventional power zoom camera, for example, a light emitter and light receiver of a distance measuring device, a zoom finder, and a zoom strobe device are arranged on a camera body. The power zoom lens, the zoom finder and the zoom strobe device are associated with each other, for example, by a plane cam.

However, such plane cams have a large surface area and require a large space to accommodate their movement. Using a known plane cam in a compact camera hinders the realization of a compact construction.

Furthermore, in a conventional power zoom camera, the view finder is located outside of the space between the light emitter and light receiver of the distance measuring device, resulting in poor utilization of this space.

SUMMARY OF THE INVENTION

The primary object of the present invention is to provide a power compact zoom camera in which the zoom finder, associated with the power zooming operation, and its surroundings are miniaturized.

Namely, the improvement of the present invention is directed to the association mechanism of the zoom lens and the zoom finder and the association mechanism of the zoom finder and the zoom strobe device.

To achieve the object mentioned above, according to the present invention, a view finder of a zoom lens camera (e.g. power zoom lens camera) is provided to include a zoom lens, an object distance measuring device having a light emitter and a light receiver, and a zoom finder device which varies the field of view of the finder in association with the zoom lens. Further, the zoom finder device is placed between the light emitter and the light receiver of the object distance measuring device.

According to another aspect of the present invention, there is provided a zoom lens camera having a view finder including a zoom lens, an object distance measuring device having a light emitter and a light receiver, and a zoom finder device which varies the field of view of the finder in association with the zoom lens. Further, the zoom finder device is placed between the light emitter and the light receiver of the object distance measuring device, and a zoom strobe device has an illuminating angle varying mechanism for varying the illumination angle in association with the zoom lens.

According to still another aspect of the present invention, an association mechanism includes a zoom finder, having a variable power lens group, and a zoom strobe device, having an illuminating angle varying mechanism. The association mechanism moves the variable power lens group in association with illuminating angle varying mechanism. A driving apparatus of the zoom strobe has a first association lever which rotates in association with the variable power lens group, a second association lever which rotates in association with the illuminating angle varying mechanism, and gear portions provided on the first and second association levers which engage with each other to rotate the first and second association levers in association.

According to still another aspect of the invention, including an association mechanism having a zoom finder having a variable power lens group movable in an optical axis direction thereof, and a zoom strobe device with an illuminating angle varying mechanism movable in the optical axis direction, whereby the variable power lens group and the illuminating angle varying mechanism are movably associated, a driving apparatus of the zoom strobe includes racks, provided on the variable power lens group and the illuminating angle varying mechanism, which extend in the optical axis direction, and a gear train provided between the racks to move the variable power lens group and the illuminating angle varying mechanism in association through the gear train.

The present disclosure relates to subject matter contained in Japanese patent applications Nos. 3-320856, 3-320857, and 3-320858 (all filed on Sep. 30, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
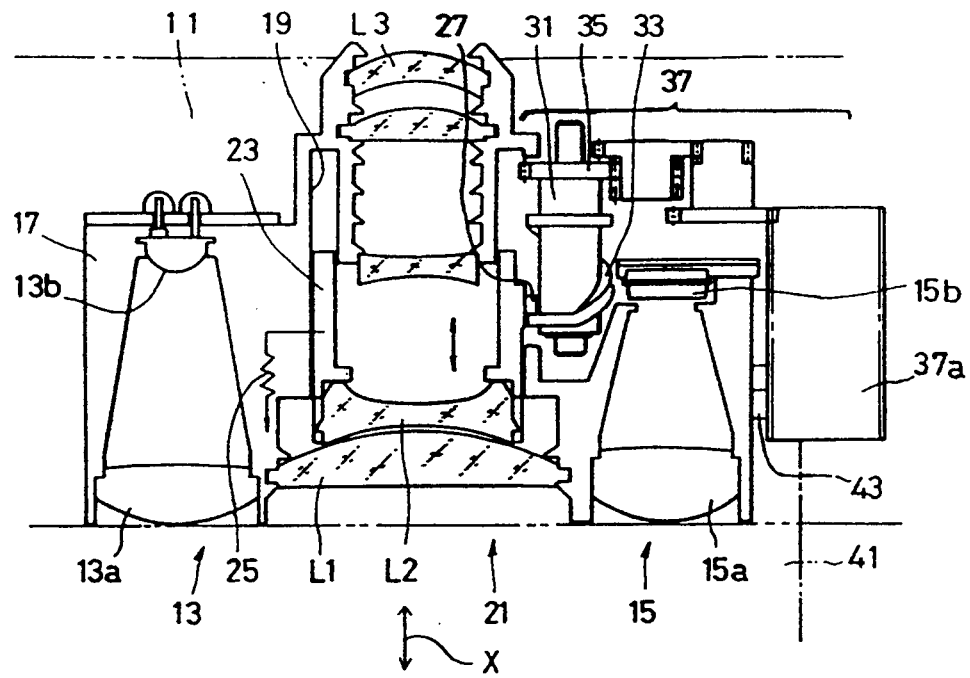
FIG. 1 is a plan view of an association mechanism of a zoom lens and a zoom finder in a power zoom camera according to the present invention.
Figure 2:
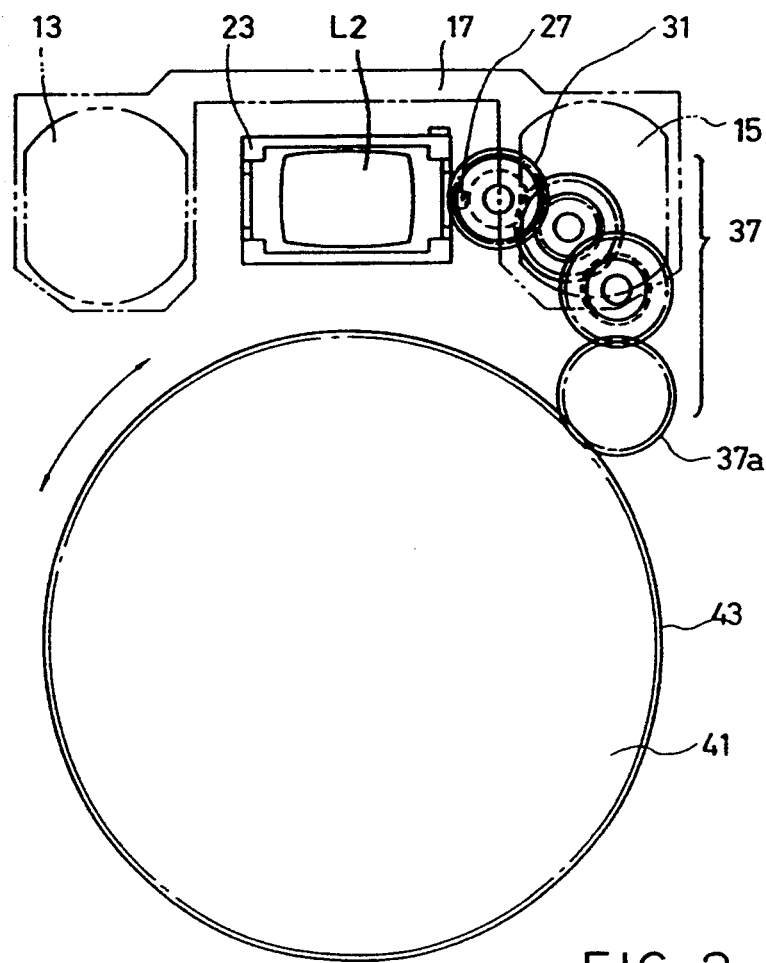
FIG. 2 is a front elevational view of an association mechanism of the zoom lens and zoom finder shown in FIG. 1.
Figure 3:
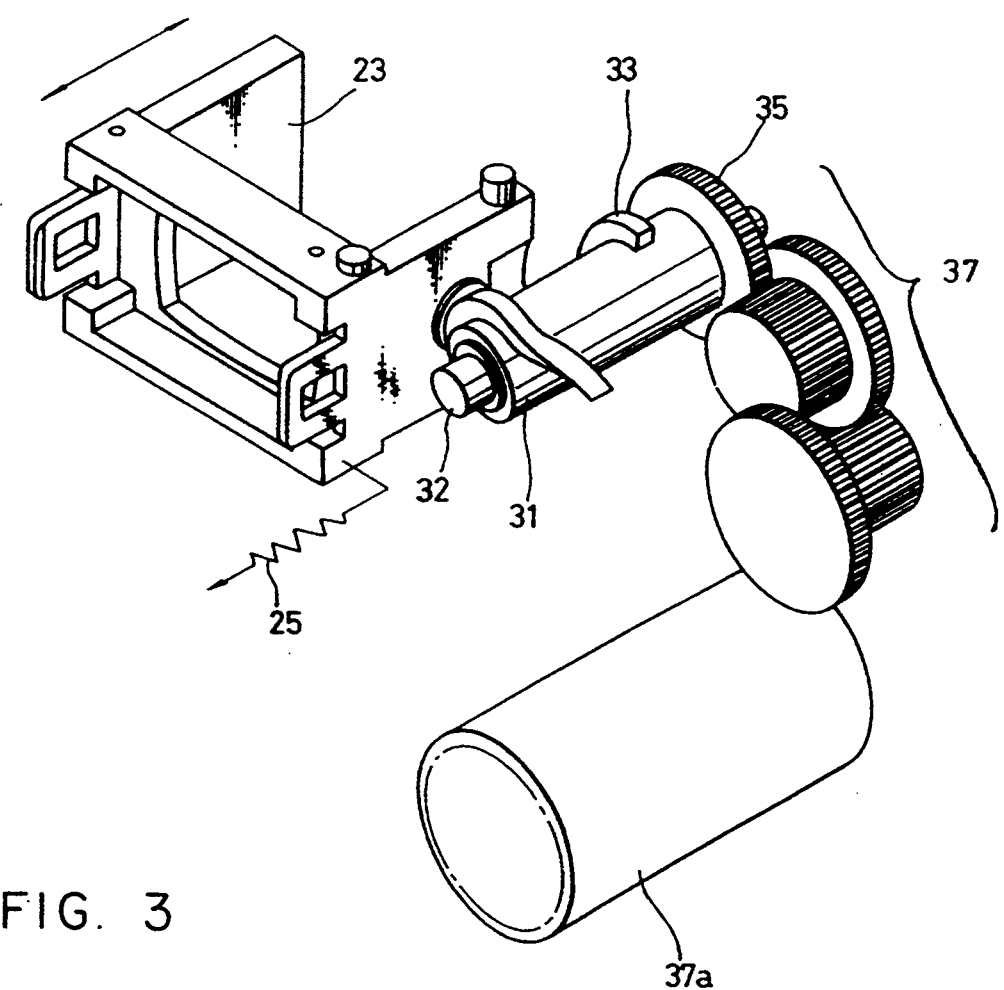
FIG. 3 is a perspective view of a main part of an association mechanism of the zoom lens and zoom finder shown in FIG. 1.

In FIGS. 1 through 3, which show a first embodiment of the present invent ion, a camera body 11 is provided on the front portion thereof with an active object distance measuring device which includes infrared light emitter 13 and an infrared light receiver 15. The infrared light emitter 13 is spaced from the infrared light receiver 15 at a predetermined base length (i.e., triangle base length). The infrared light emitter 13 includes a light emitting lens 13a and an IRED (infrared light emitting diode) 13b. The infrared light receiver 15 includes a light receiving lens 15a and a PSD (position detecting device) 15b. As is well known, in the active distance measuring device, infrared light emitted from an infrared light emitter (13) is reflected by an object to be photographed, and is then received by an infrared light receiver (15). The object distance can then be measured in accordance with the light signal received using a triangulation measuring method per se known.

The infrared light emitter 13 and receiver 15 are integrally formed in a unit frame 17 made of synthetic resin. A zoom finder device 21 is integrally provided between the infrared light emitter 13 and the infrared light receiver 15 on the unit frame 17. An optical system of the zoom finder 21 includes an objective lens L1 located closest to an object to be taken, a variable power lens L2 located behind the objective lens L1 and movable in the optical axis direction, and an eyepiece L3, etc. A lens barrel portion of the optical system of the zoom finder 21 is integral with the unit frame 17.

Variable power lens L2 is secured to a lens frame 23, which is slidably guided in and by a guide groove 19 formed in the unit frame 17, so as to move in the direction of optical axis X. The lens frame 23 is continuously biased by a spring 25 toward the object to be taken.

Cylindrical cam 31 is rotatably supported by a shaft 32, extending parallel to the optical axis X (i.e., in the direction of movement of the lens frame 23), on the side of the infrared light receiver 15. The cylindrical cam 31 is provided on the outer peripheral surface thereof with a helical cam projection 33, with which a cam pin 27, provided on the lens frame 23, contacts. Contact of the cam pin 27 with the cam surface of the helical cam projection 33 is maintained by the elastic force of the spring 25 which continuously biases the lens frame 23 toward the object to be photographed, as mentioned above.

Alternatively, the helical cam projection 33 can be replaced with a helical cam groove in which the cam pin 27 is fitted.

Cylindrical cam 31 is provided on the rear end thereof with a gear 35, which is operatively connected to a sector gear 43 provided on an outer peripheral surface of a cam cylinder 41 of the zoom lens, through a gear train 37. A gear 37a of the gear train 37, which is in mesh with the sector gear 43, is in the form of a long cylinder extending in the optical axis direction X. Note that the gear train 37 and the cam cylinder 41 are arranged side by side in FIG. 1 for the purpose of clarification. The actual arrangement thereof is as shown in FIG. 2.

A zoom motor (not active object distance measuring device which includes to move a group of zoom lenses (not shown) in the optical axis direction to thereby carry out the zooming operation. Rotation of cam cylinder 41 causes rotation of cylindrical cam 31 through the sector gear 43, the gear train 37 and the gear 35. As a result, the cam pin 27 moves forwards and backwards in sliding contact with the cam projection 33, so that the lens frame 23, and accordingly, the variable power lens L2, are driven in the optical axis direction to carry out the zooming operation of the zoom finder 21.

Thus, in the illustrated embodiment, when the power zooming operation is effected, the lens frame 23 is moved in association with the rotation of the cam cylinder 41 through the gear train 37 and the cylindrical cam 31, so that the magnification (angle of field) of the finder can be varied in accordance with the change in focal length (angle of view).

Since the zoom finder 21 is provided between the light emitter 13 and the light receiver 15, as mentioned above, the space defined between the light emitter 13 and the light receiver 15 is effectively utilized. This makes it possible to increase the distance between the light emitter 13 and the light receiver 15, i.e., the base length, resulting in a greater precision of measurement of the object distance. Furthermore, since the light emitter 13, the light receiver 15, and the zoom finder 21 are made integral with each other by the unit frame 17, it is possible to easily enclose the optical system of the zoom finder 21 and incorporate the integrated assembly in the camera body 11.

The above discussion has been directed to the zooming association mechanism of the zoom taking lens and the zoom finder 12.

Figure 4:
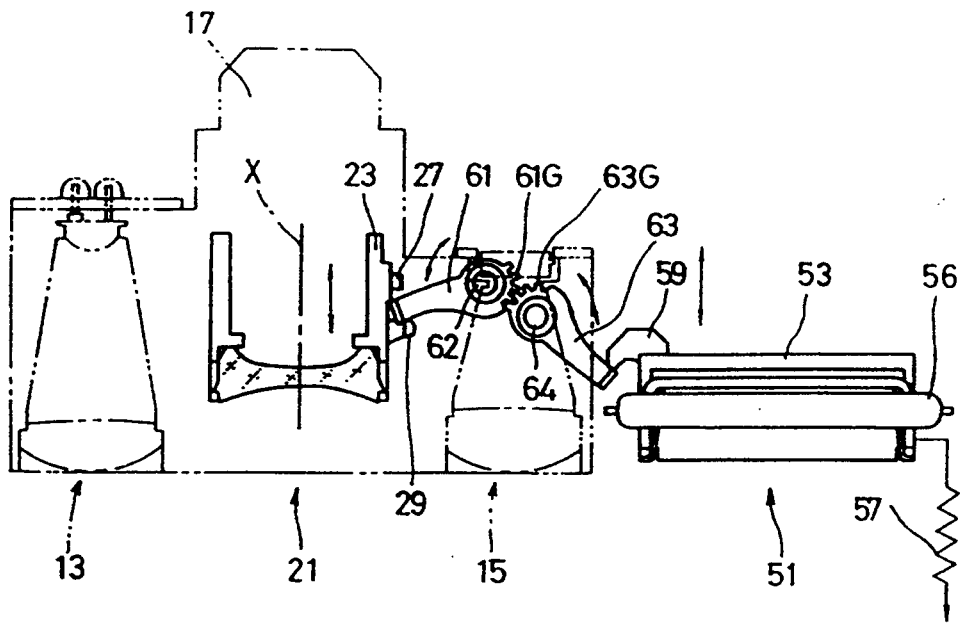
FIG. 4 is a plan view of an association mechanism of a zoom finder and a zoom strobe device in a power zoom camera according to the present invention.
Figure 5:
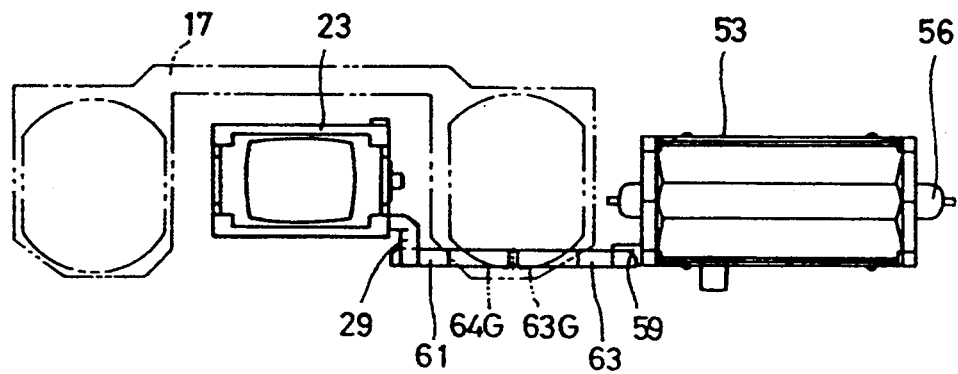
FIG. 5 is a front elevational view of an association mechanism of the zoom finder and zoom strobe device shown in FIG. 4.
Figure 6:
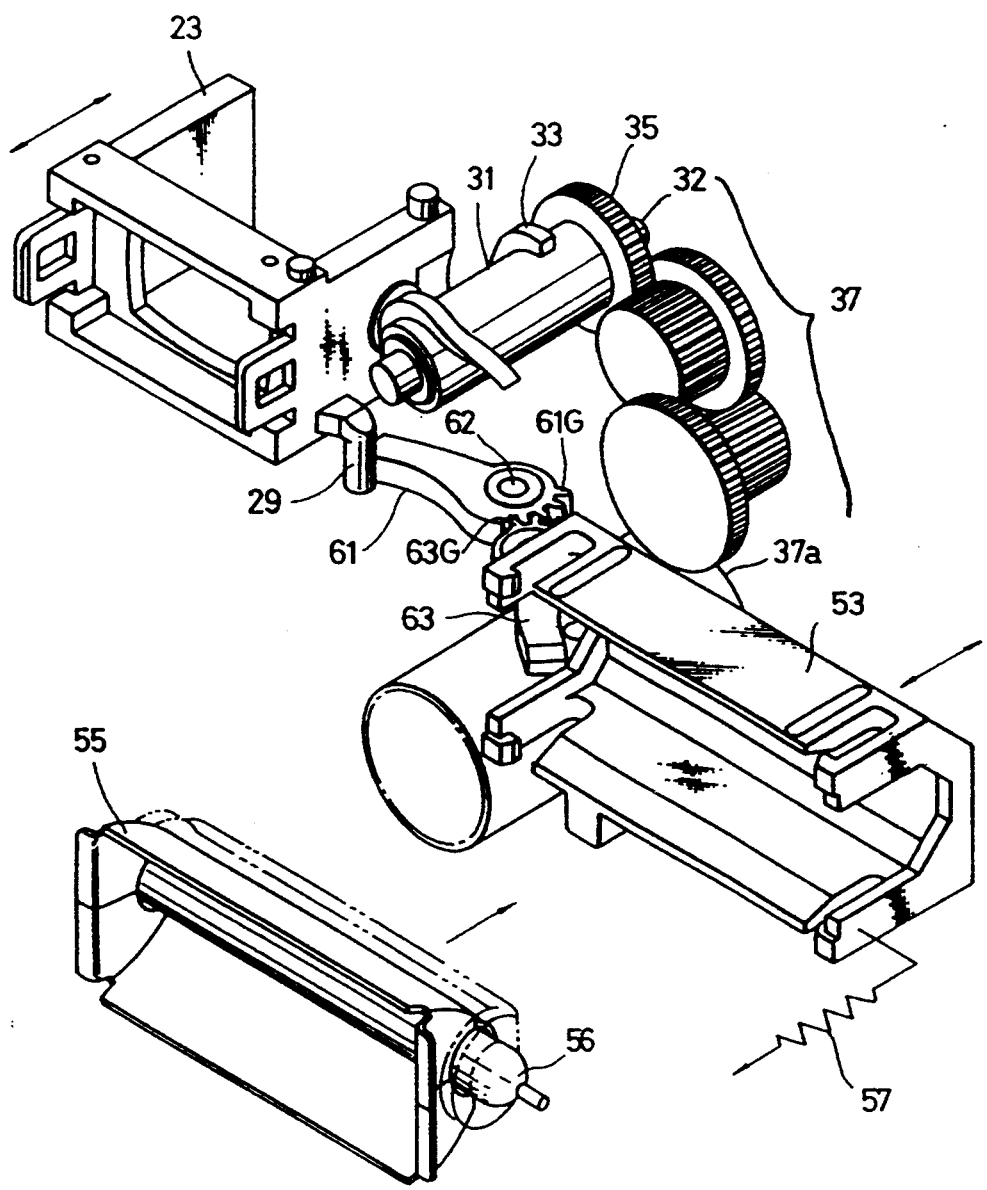
FIG. 6 is a perspective view of a main part of an association mechanism of the zoom lens and zoom finder shown in FIG. 4.

FIGS. 4 through 6 show an association mechanism of the zoom finder 21 and the zoom strobe device 51. The zoom strobe device 51 is located at the side of the infrared light receiver 15. Thus, the relative positioning of the components, from left to right viewing from the front of the view finder, are as follows: the infrared light emitter 13, the zoom finder 21, the infrared light receiver 15, and the zoom strobe device 51. The zoom strobe device 51 includes a movable frame 53, which is movable substantially in the optical axis direction; a reflecting shade 55 (see FIG. 6), secured to the movable frame 53; and a xenon tube (lamp) 56. A Fresnel lens (not shown) is provided in front of the reflecting shade 55. The movable frame 53 (i.e., the reflecting shade 55 and the xenon tube 56) serves as an illuminating angle varying member which varies the illuminating angle by varying the distance thereof from the Fresnel lens. The movable frame 53 is continuously biased in the direction of an object to be photographed, by a spring 57.

Lens frame 23 is provided, on the side face thereof adjacent to the movable frame 53, with an association pin 29. The front end of a first association lever 61, pivoted with respect to the unit frame 17 through a vertical pivot shaft 62, bears against the back side of association pin 29. The movable frame 53 is provided, on the side face thereof, adjacent to the lens frame 23, with an association pawl 59. The back side of a second association lever 63, pivoted with respect to the unit frame 17 through a vertical pivot shaft 64, bears against the front side of association pawl 59. The association levers 61 and 63 have gear portions 61G and 63G coaxial to the shafts 62 and 64, respectively. The gears 61G and 63G engage with each other to move the respective association levers 61 and 63 in association with each other.

Zoom finder 21 and zoom strobe device 51, as constructed above, are associated with each other in the following manner: when the lens frame 23 is moved rearwardly, the first association lever 61 is rotated in the clockwise direction, as viewed in FIGS. 4 and 6, through the association pin 29. Rotation of first association lever 61 drives second association lever 63 through gears 61C and 63G, to rotate in the counterclockwise direction, to move the association pawl 59, and accordingly, the movable frame 53, rearwardly against the biasing force of the spring 57. Conversely, when the lens frame 23 is moved forwardly, the first association lever 61 and the second association lever 63 are rotated in the counterclockwise direction and the clockwise direction, respectively, to move the movable frame 53 forwardly by the biasing force of the spring 57. Thus, the movable frame 53 is moved in association with the lens frame 23 to vary the field magnification of the zoom finder 21, and the illuminating angle of the zoom strobe device 51.

As can be seen from the above discussion, in the illustrated embodiment, when the cam ring 41 is rotated to effect the power zooming operation, the lens frame 23 is moved in association therewith through the gear train 37 and the cylindrical cam 31 to vary the field magnification (angle of field) of the zoom finder in accordance with the change in the focal length (angle of view). At the same time, the movable frame 53 is moved in association with the movement of the lens frame 23, to vary the illuminating angle in accordance with a change in the angle of view.

Furthermore, in the illustrated embodiment, since the zoom finder 21 and the zoom strobe device 51 are associated with each other by small members, i.e., first and second association levers 61 and 63, the camera body can be miniaturized to realize a compact zoom camera.

Note that the displacement of the movable frame 53, with respect to the displacement of the lens frame 23, can be adjusted by adjustment of the distances between the center points of rotation of the association levers 61 and 63, and the points at which the association levers 61 and 63 come into slidable contact with the association pin 29 and the association pawl 59, respectively. Additionally, the displacement can be adjusted by adjustment of the gear ratio of the gears 61G and 63G.

Figure 7:
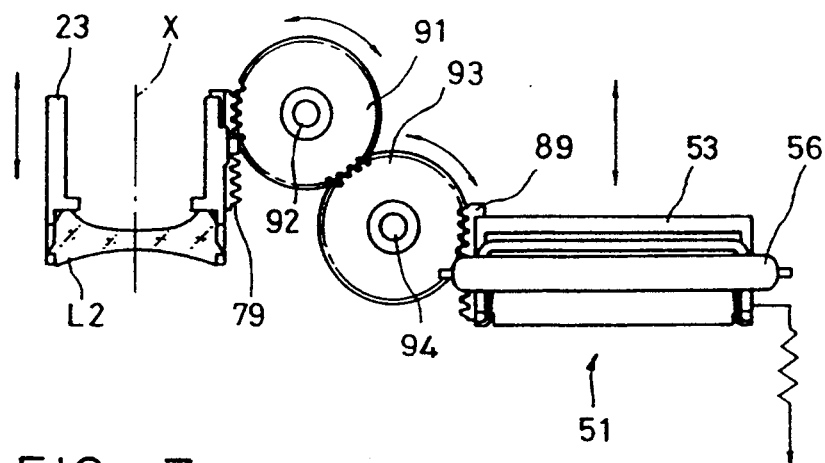
FIG. 7 is a plan view of an association mechanism of a zoom finder and a zoom strobe device in a power zoom camera according to another embodiment of the present invention.
Figure 8:
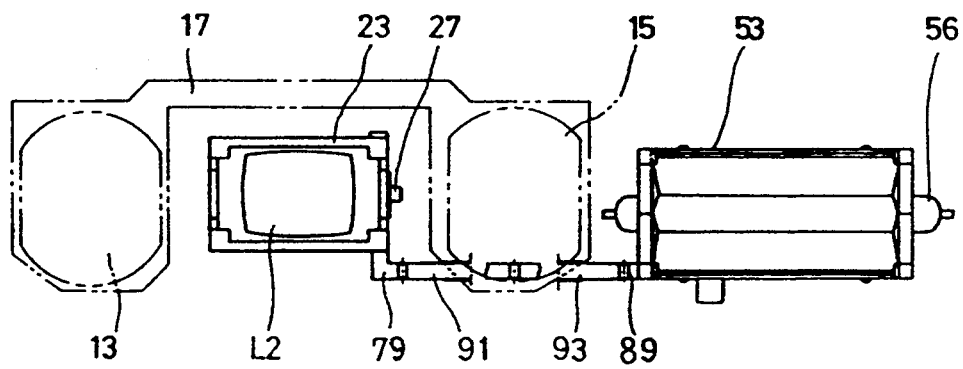
FIG. 8 is a front elevational view of an association mechanism of the zoom finder and zoom strobe device shown in FIG. 7; and, FIG. 9 is a perspective view of a main part of an association mechanism of the zoom lens and zoom finder shown in FIG. 7.
Figure 9:
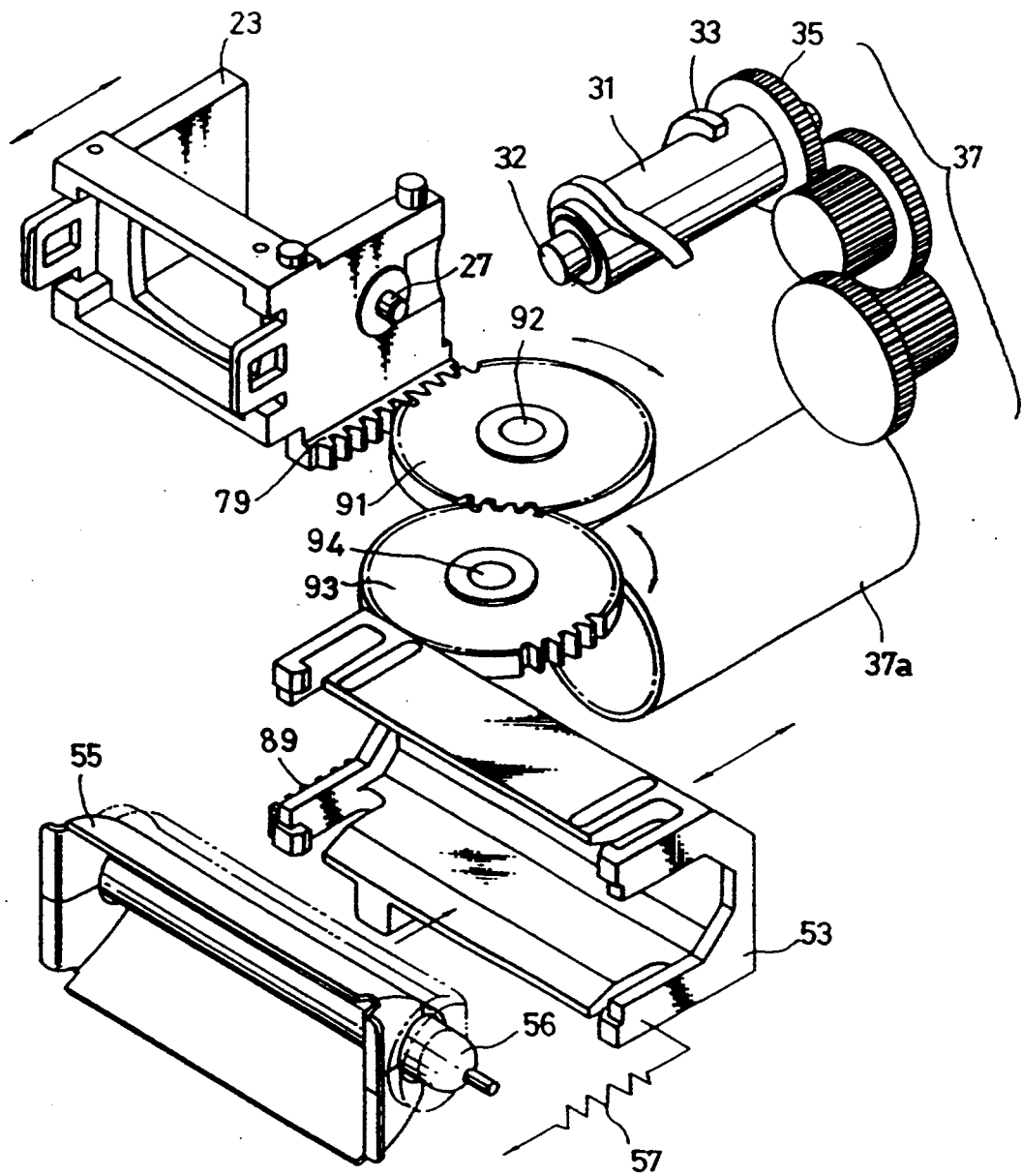

FIGS. 7 through 9 show another embodiment of the present invention of an association mechanism of the zoom finder 21 and the zoom strobe device 51. In this embodiment, the construction of the zoom strobe device 51 is the same as that in the above-mentioned embodiment, shown in FIGS. 4 through 6, that is, the zoom strobe device 51 is located on the side of the infrared light receiver 15 in an extension of the alignment of the infrared light emitter 13, the zoom finder 12, and the infrared light receiver 15. The zoom strobe device 51 includes a movable frame 53, which is movable substantially in the optical axis direction, a reflecting shade 55, (see FIG. 9) secured to the movable frame 53, and a xenon tube (lamp) 56. A Fresnel lens (not shown) is provided in front of the reflecting shade 55. The movable frame 53 (i.e., the reflecting shade 55 and the xenon tube 56) serve as an illuminating angle varying member which varies the illuminating angle by varying the distance thereof from the Fresnel lens. The movable frame 53 is continuously biased forward by a spring 57.

Lens frame 23 and the movable frame 53 are provided, on opposing side faces thereof, with racks 79 and 89 extending in a direction parallel to the direction of movement of the lens frame 23 and the movable frame 53, respectively. A pair of spur gears 91 and 93 are provided between the racks 79 and 89, and are rotatably supported on the unit frame 17 by respective vertical shafts 92 and 94 (extending in a direction perpendicular to the plane of the drawing in FIG. 7) mounted to the camera body 11. The spur gears 91 and 93 engage with associated racks 79 and 89 to move the latter, and accordingly, the lens frame 23 and the movable frame 53, in association with each other, respectively.

Zoom finder 21 and the zoom strobe device 51, shown in FIGS. 7 through 9, are associated as follows. When the lens frame 23 is moved backwards, the spur gears 91 and 93 are rotated through the rack 79 in the clockwise and counterclockwise directions, respectively, as viewed in FIG. 7. As a result, the rack 89 is moved backwards, so that the movable frame 53 is moved backwards, against the biasing force of the spring 57. Conversely, when the lens frame 23 is moved forwards, the spur gears 91 and 93 are rotated in the counterclockwise and clockwise directions, respectively as viewed in FIG. 7, to advance the movable frame 53. Thus, the movable frame 53 is moved in association with the lens frame 23 to vary the field magnification of the zoom finder 21 and the illuminating angle of the zoom strobe device 51 in an associative manner.

As can be seen from the above discussion, in the modified embodiment illustrated in FIGS. 7 through 9, when the cam ring 41 is rotated to effect the power zooming operation, the lens frame 23 is moved in association therewith through the gear train 37 and the cylindrical cam 31 to vary the field magnification (angle of field) of the zoom finder in accordance with the change in focal length (angle of view). At the same time, the movable frame 53 is moved in association with the movement of the lens frame 23 to vary the illuminating angle in accordance with the change in angle of view.

Furthermore, in the modified embodiment, since the zoom finder 21 and the zoom strobe device 51 are associated with each other by small members, i.e., spur gears 91 and 93, the camera body can be miniaturized to realize a compact zoom camera.

Although a gear train having of a pair of spur gears 91 and 93 is provided to move the lens frame 23 and the movable frame 53 in association, the size and the number of gears are not limited to those in the illustrated embodiment. It is possible to substitute each spur gear with a double gear to easily adjust the displacement of the movable frame 53 with respect to the displacement of the lens frame 23. Furthermore, although the racks 79 and 89 lie in the same horizontal plane, it is possible to provide the racks 79 and 89 at different levels of height (i.e., in a stacked manner).

I claim:

1. View finder apparatus of a zoom lens camera, said view finder apparatus comprising:
    a zoom lens;
    an object distance measuring device having a light emitter and a light receiver;
    a zoom finder device comprising means for varying the field of view of said zoom finder device in association with said zoom lens, said zoom finder device being positioned between said light emitter and said light receiver of said object distance measuring device;
    a strobe positioned so that one of said light emitter and said light receiver is positioned between said strobe and said zoom finder device; and
    means for associating movement between said zone finder device and said strobe so that said strobe is moved in response to movement of said zoom finder device.

2. The apparatus according to claim 1, wherein said zoom lens comprises a power zoom lens.

3. The apparatus according to claim 2, wherein said zoom finder device comprises a variable power lens group movable in an optical axis direction of said zone lens, and an association drive mechanism for driving said variable power lens group in association with a zooming operation of said power zoom lens.

4. The apparatus according to claim 3, wherein said association drive mechanism is positioned between said variable power lens group and said light receiver.

5. The apparatus according to claim 4, further comprising a lens frame, which is movable in a direction substantially parallel to the optical axis of said zoom lens, to support said variable power lens group.

6. The apparatus according to claim 5, wherein said association drive mechanism comprises an association pin provided on the lens frame, a cylindrical can which is rotated about a rotational shaft substantially parallel to the optical axis and which engages with said association pin to move said lens frame, and a gear train which rotates said cylindrical cam in association with the power zooming operation.

7. The view finder apparatus according to claim 1, wherein said associating means comprises first transmitting means for transmitting motion from said zoom lens to said zoom finder device to move said zoom finder device in association with movement of said zoom lens; and second transmitting means for transmitting motion from said zoom finder device to said strobe to move said strobe in association with movement of said zoom finder device.

8. The view finder apparatus according to claim 7, wherein said second transmitting means comprises first association means for moving at least a first member in association with the lens of said zoom finder device and second association means for moving at least a second member in association with said strobe, wherein each of said first association means and said second association means comprises means for continuously engaging said first and second members with each other to thereby associatively move said first and second association members.

9. The view finder apparatus according to claim 8, wherein said first member comprises a first lever which rotates in association with movement of the lens of said zoom finder device, and further wherein said second member comprises a second lever which rotates in association with movement of said strobe.

10. The view finder apparatus according to claim 8, wherein said means for continuously engaging comprise respective gear portions provided on each of said first member and said second member, whereby said respective gear portions engage with each other to thereby associatively move said first and second members with respect to each other.

11. The view finder apparatus according to claim 9, wherein said means for continuously engaging comprise respective gear portions provided on each of said first lever and said second lever, whereby said respective gear portions engage with each other to thereby associatively rotate said first and second levers with respect to each other.

12. The view finder apparatus according to claim 1, further comprising a unitary frame for holding said object distance measuring device and said zoom finder device as a unitary subassembly of the zoom lens camera.

13. A zoom lens camera comprising:
a zoom lens;
a view finder assembly including a view finder, an object distance measuring device having a light emitter and a light receiver, and a zoom finder device which varies the field of view of said view finder in association with the zoom lens, said zone finder device being positioned between said light emitter and said light receiver of said object distance measuring device;

a zoom strobe device positioned so that one of said light emitter and said light receiver is positioned between said zoom strobe device and said view finder, said zoom strobe device having an illuminating angle varying mechanism for varying the illuminating angle of the zoom strobe device in association with the zoom lens; and means for associating movement between said zoom finder device and said illuminating angle varying mechanism;

said zoom strobe device comprising an illuminating angle varying member movable in the optical axis direction;

said zoom finder device comprising a variable power lens group movable in an optical axis direction of the zoom lens, and an association drive mechanism for driving said variable power lens group in association with a zooming operation of the zoom lens;

said zoom lens camera further comprising a first association lever which rotates in association with movement of said variable power lens group, a second association lever which rotates in association with movement of said illuminating angle varying member, and gear portions provided on said first and second association levers, to engage with each other, wherein said illuminating angle varying member and said zoom finder device are associated by said first and second association levers and gear portions.

14. A zoom lens camera according to claim 13, further comprising a lens frame which is movable in a direction substantially parallel to the optical axis of the zoom lens to support said variable power lens group.

15. A zoom lens camera according to claim 14, wherein said lens frame is provided with an association pin projecting therefrom to rotate said first association lever.

16. A zoom lens camera according to claim 15, wherein said illuminating angle varying mechanism comprises a reflecting shade, a xenon lamp, and a movable frame which supports said reflecting shade and said xenon lamp.

17. A zoom lens camera according to claim 16, wherein said movable frame is provided with an association pawl that engages with said second association lever to move said movable frame in the optical axis direction.

18. A zoom lens camera according to claim 17, further comprising racks provided on said illuminating angle varying member and said variable power lens group and extending parallel to the optical axis, and a gear train in mesh with said racks, wherein said illuminating angle varying member and said variable power lens group are associated by said racks and said gear train.

19. The zoom lens camera of claim 13, further comprising a unitary frame for holding said object distance measuring device and said zoom finder device as a unitary sub-assembly of the zoom lens camera.

20. Apparatus including a zoom finder having a variable power lens group movable in an optical axis direction and a zoom strobe device having an illuminating angle varying mechanism movable in the optical axis direction, wherein the variable power lens group and the illuminating angle varying mechanism are associatively moved, said apparatus comprising:

a driving apparatus of the zoom strobe having racks provided on the variable power lens group and the illuminating angle varying mechanism and extending in the optical axis direction, and a gear train provided between said racks through which the variable power lens group and the illuminating angle varying mechanism are associatively moved.

21. The apparatus of claim 26, wherein the variable power lens group is mounted in a camera having a power zoom lens, and in which the magnification thereof is varied in accordance with a zooming operation of said power zoom lens.

22. The apparatus of claim 20, further comprising a lens frame which supports the variable power lens group to move the variable power lens group in the optical axis direction, wherein one of said racks is provided on said lens frame.

23. The apparatus of claim 22, wherein the illuminating angle varying mechanism comprises a reflecting shade, a xenon lamp, and a movable frame which supports said reflecting shade and said xenon lamp.

24. The apparatus of claim 23, wherein another of said racks is provided on said movable frame.

* * * * *

UNITED STATES PATENT AND TRADEMARK OFFICE
CERTIFICATE OF CORRECTION

PATENT NO. : 5,335,030
DATED : August 2, 1994
INVENTOR(S) : Shinya SUZUKA

It is certified that error appears in the above-indentified patent and that said Letters Patent is hereby corrected as shown below:

At column 6, line 57 (claim 1, line 15), change "zone" to ---zoom---.
Column 7, line 10 (claim 6, line 3), change "can" to ---cam---.
At column 6, line 65 (claim 3, line 3), change "zone" to ---zoom---.
At column 7, line 68 (claim 13, line 7), change "zone" to ---zoom---.
At column 9, line 10 (claim 21, line 1), change "26" to ---20---.

Signed and Sealed this

Fourth Day of April, 1995

BRUCE LEHMAN

*Attest:*

*Attesting Officer*   *Commissioner of Patents and Trademarks*